(No Model.) 9 Sheets—Sheet 2.
E. S. STAPLES.
BAG MACHINE.
No. 544,197. Patented Aug. 6, 1895.
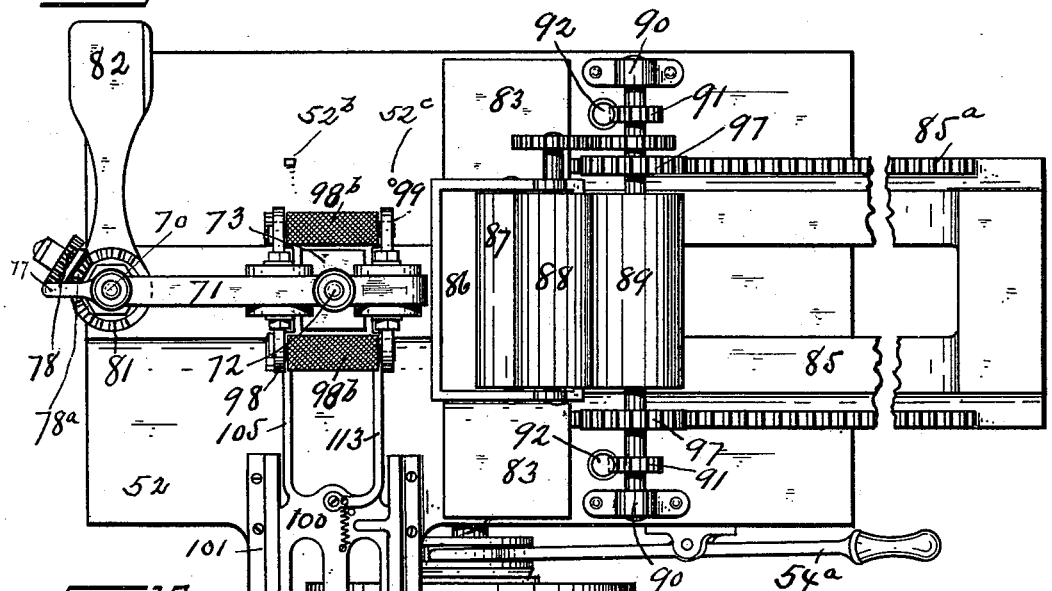
Witnesses
Inventor
Elisha S. Staples,
By Attorney
Frank H. Allen.

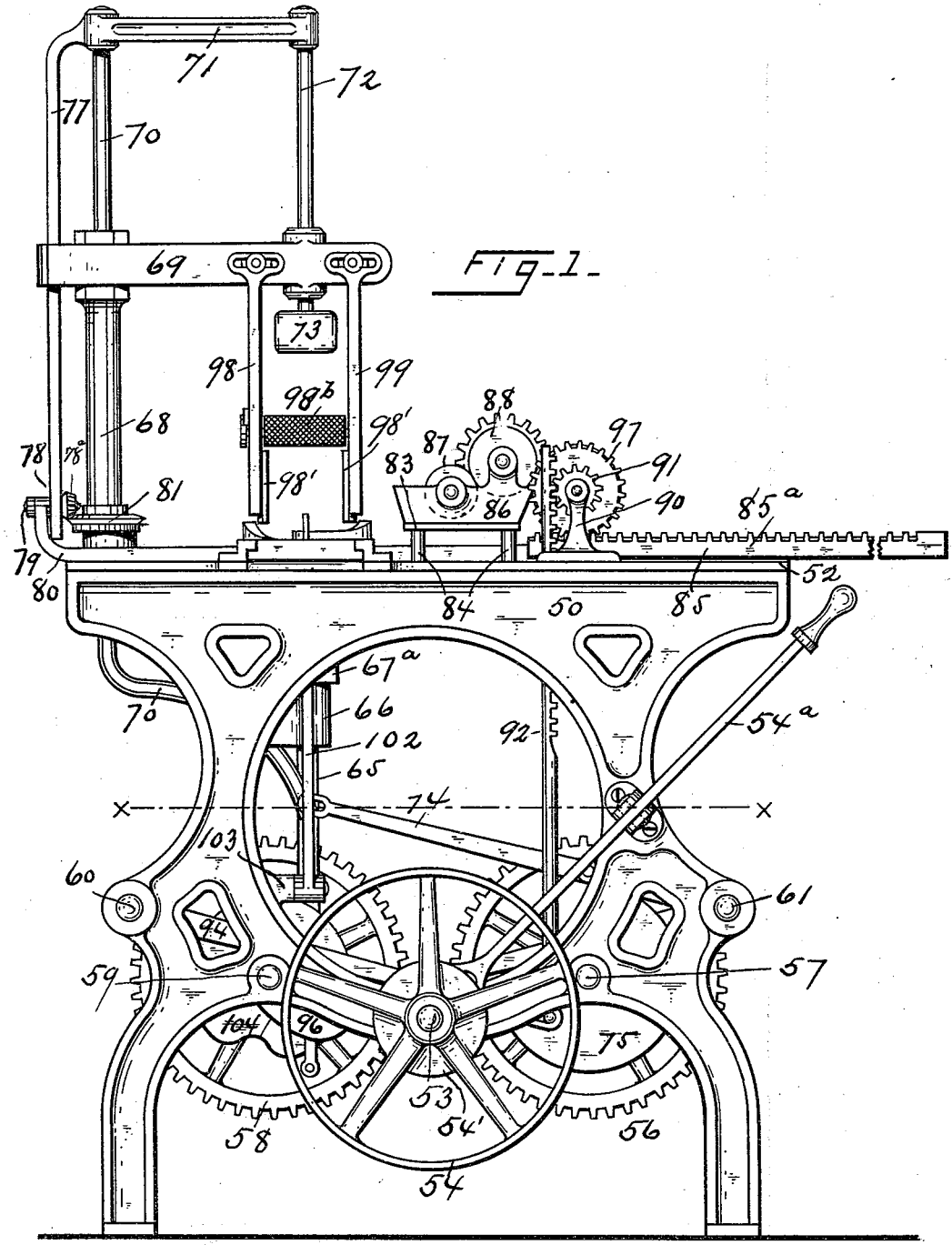

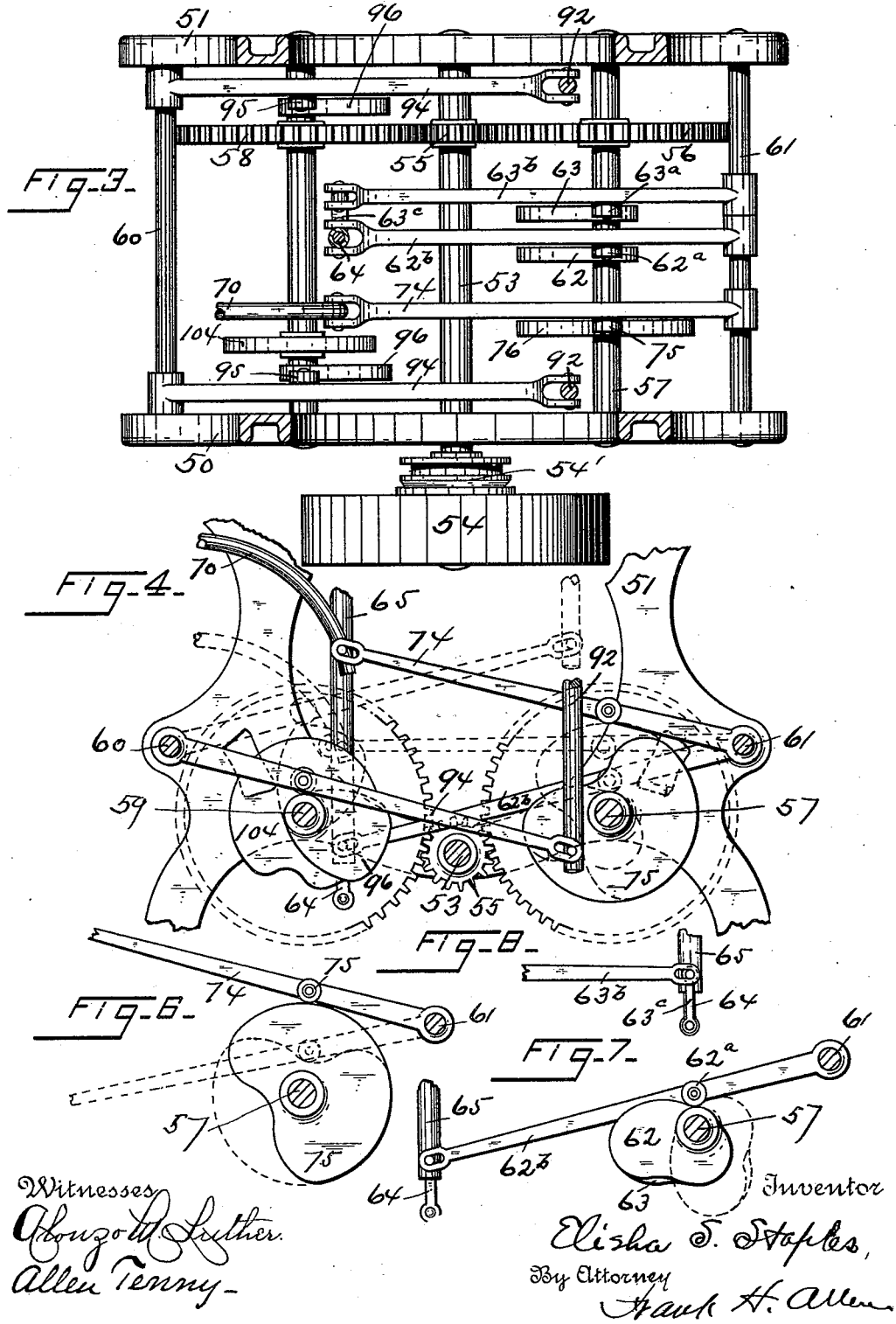

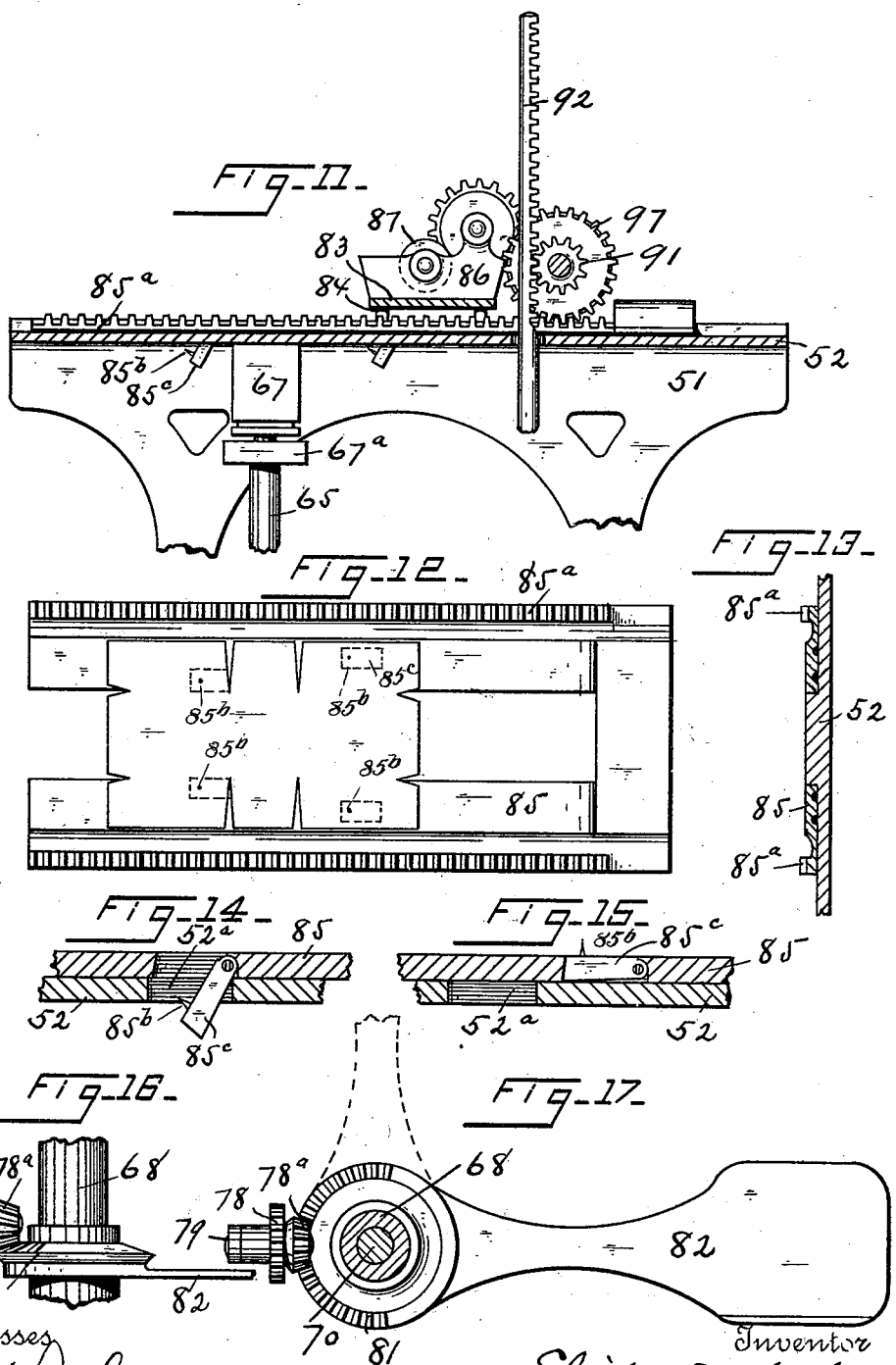

(No Model.) 9 Sheets—Sheet 5.
E. S. STAPLES.
BAG MACHINE.
No. 544,197. Patented Aug. 6, 1895.
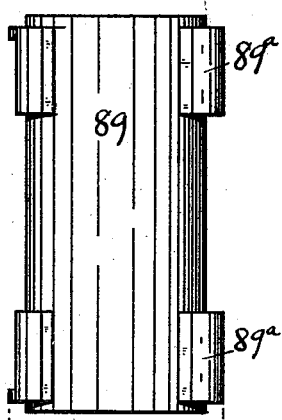
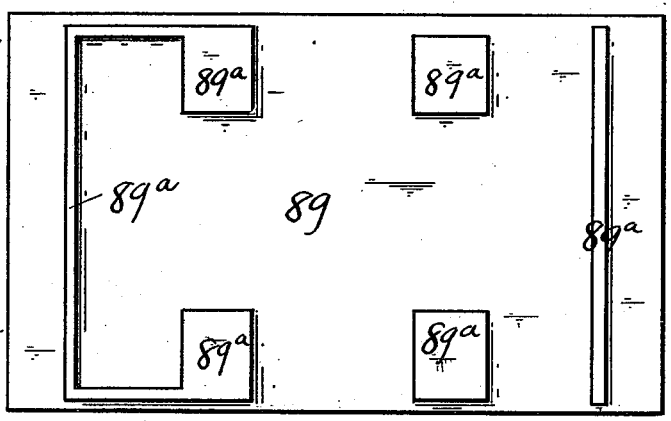
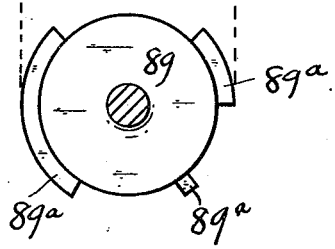
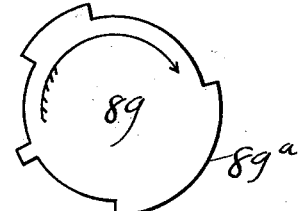
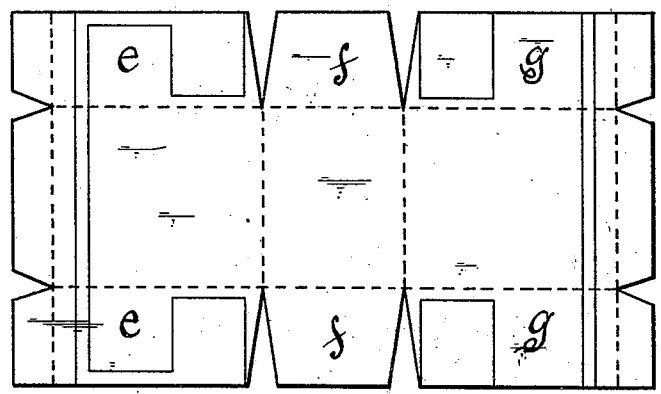
Witnesses
Inventor
Elisha S. Staples
By Attorney
Frank H. Allen.

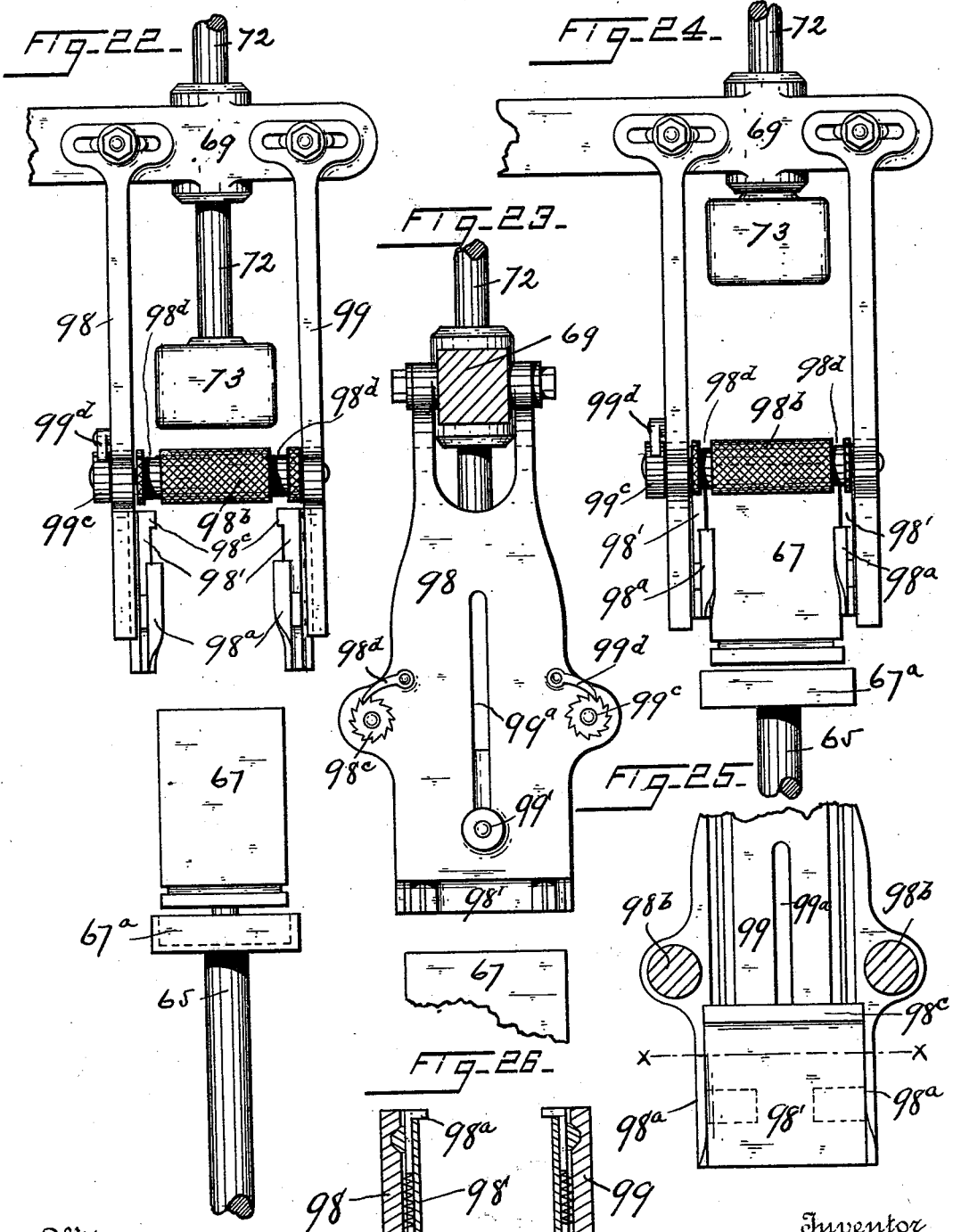

(No Model.) 9 Sheets—Sheet 7.
E. S. STAPLES.
BAG MACHINE.
No. 544,197. Patented Aug. 6, 1895.
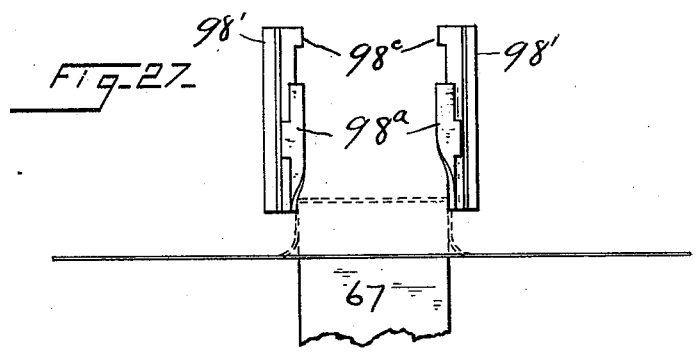
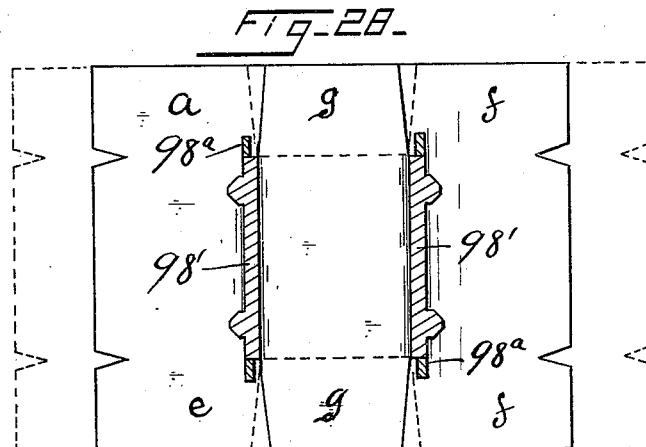
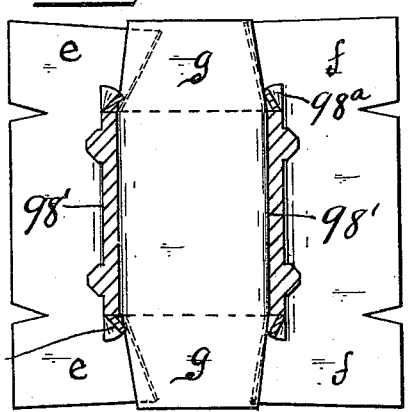
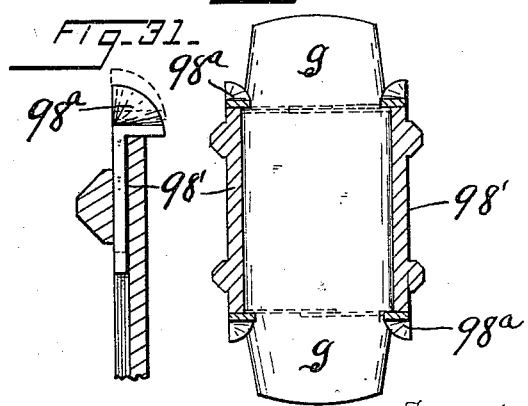
Witnesses
Inventor
Elisha S. Staples,
By Attorney
Frank H. Allen

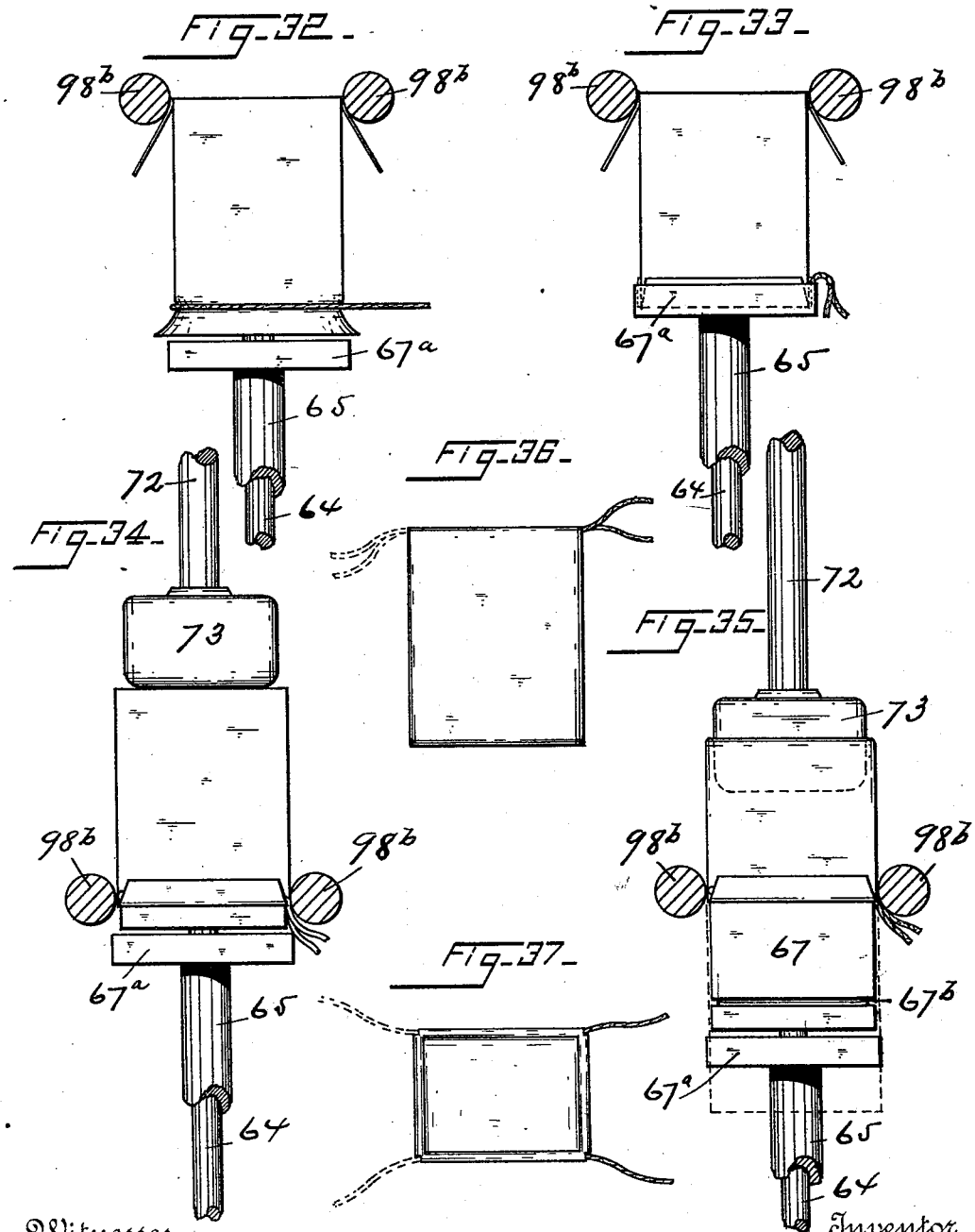

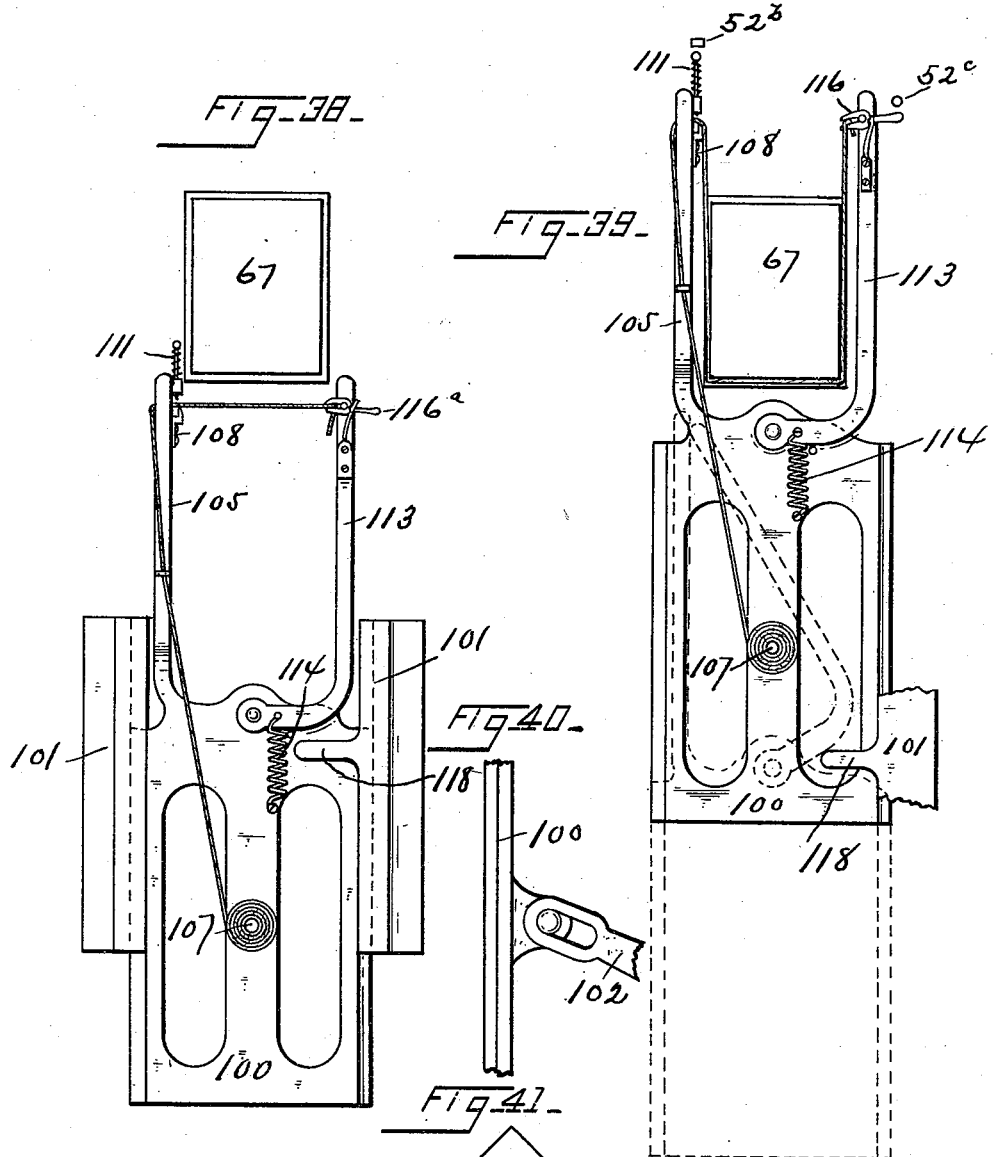

UNITED STATES PATENT OFFICE.

ELISHA S. STAPLES, OF NORWICH, ASSIGNOR OF THREE-EIGHTHS TO ELIAS W. STAPLES, OF ESSEX, CONNECTICUT.

BAG-MACHINE.

SPECIFICATION forming part of Letters Patent No. 544,197, dated August 6, 1895.

Application filed September 17, 1894. Serial No. 523,297. (No model.)

*To all whom it may concern:*

Be it known that I, ELISHA S. STAPLES, a citizen of the United States, residing at Norwich, New London county, in the State of Connecticut, have invented certain new and useful Improvements in Bag-Machines, which improvements are fully set forth and described in the following specification, reference being had to the accompanying nine sheets of drawings.

The immediate object of this invention is to produce a machine for automatically forming (from previously-cut cloth-blanks) small bags of the class commonly used for marketing smoking-tobacco; and with this object in view I have provided various mechanism for feeding, pasting, folding, stringing, turning, and delivering said blanks, which mechanisms, acting in harmony in a single organization, will produce cheaply and rapidly bags of the class referred to.

To more clearly explain my said invention I have annexed hereto several sheets of drawings, in which—

Figure 1 is a side elevation of my improved bag-machine, and Fig. 2 is a plan view of the same. Fig. 3 is a plan view of certain cams, levers, shafts, &c., located below line $xx$ of Fig. 1. Fig. 4 is an elevation of the cams, levers, &c., that move the pasting devices and the upper plunger or follower, the front machine-frame being removed to expose said parts to view; and Fig. 5 is a similar view showing particularly the cams and levers that control the vertical movements of the main plunger on which the bags are formed, and also illustrating the paster-lever in its highest position. Fig. 6 is a detached view of the cam and lever that control the vertical movements of the upper or follower plunger, and Fig. 7 is a similar view of the cams and one of the levers that control the vertical movements of the lower or main plunger. Fig. 8 is a detail view of the lower end of the main plunger-rod from the side opposite to that of Fig. 7, showing particularly the means for connecting the said plunger-rod with its operating-lever. It may be explained here that the main plunger-rod (hereinafter designated as 64) has mounted thereon a longitudinally-movable tube 65, and both the plunger-rod and said tube are provided with independently-operating levers and cams, the levers and cams being arranged side by side, and the cams being so nearly alike that the levers move in unison throughout the greater part of their movement, as fully explained hereinafter. In Figs. 4, 5, and 7 said levers are shown as moving together, while in Fig. 9 the lever that controls the movements of the main plunger is shown as somewhat above the companion lever. In Fig. 10 I have shown in dotted lines a portion of the machine-frame having hinged thereto a lever that controls the stringing mechanism, and also a cam by means of which said lever is moved at stated times. Fig. 11 is a side view of the pasting devices and of the carriage by means of which the cloth-blanks are carried into the machine and properly located over the plunger on which they are to be formed into bags. Fig. 12 is a plan view of said carriage, and Fig. 13 a cross-sectional view of the same. Figs. 14 and 15 are sectional views of a portion of the machine bed or table and of a portion of the said blank-carriage mounted thereon, the carriage having hinged therein certain plates with upwardly-projecting pins, upon which the cloth-blanks are stretched one at a time by the machine-operator. These hinged plates at the proper time drop through openings in the machine-bed, and the pins are thus withdrawn from the cloth-blanks, leaving the latter in position to be operated upon by the main plunger. Figs. 16 and 17 are, respectively, side and plan views of a plate, by means of which the finished bag is removed from the machine. Fig. 18 shows top and end views of the paste-roll, and Fig. 19 is a development of the same. Fig. 20 illustrates the relative positions of said roll and the cloth-blank as the latter passes beneath the former to receive a supply of paste at certain predetermined points. Fig. 21 is a plan view of one of the bag-blanks, having outlined thereon the pasted portions and having indicated by dotted lines the various folds necessary to produce the finished bag. Figs. 22 and 24 are side elevations of the main (lower) plunger upon which the bags are formed and of the upper plunger or follower, also of the folding mechanisms, by means of which the various flaps of the blank are folded, overlapped, and pressed together. Fig. 23 is an elevation of the same parts as viewed from the left-hand side of Fig. 22. Fig. 25 is an inner side view of the pendent plate 99, and Fig. 26 is a cross-sectional view of the folders and their supporting-plates taken on line $xx$ of Fig. 25. Figs. 27 to 30 illustrate successive stages in the forming of a bag by my improved machine, and Fig. 31 is a cross-sectional view of one of the pendent plates provided to support the folders proper with one of said folders in position. Figs. 32, 33, 34, and 35 illustrate and aid in explaining the manner of folding the bottom flaps of the bag as well as the flaps that cover the string. In Figs. 36 and 37 are shown side and top views of the finished bag or rather the bag as delivered by the machine ready to have the string-ends tied. Fig. 38 is a plan view of the main plunger and of the string carrying and cutting devices, the latter being shown as about to advance and carry the string around three sides of the bag. The same parts are shown in Fig. 39 with the carriage advanced and nearly in position to sever the string. Fig. 40 is a view of a portion of the string-carriage and of the upper end of the lever-arm, by means of which said carriage is moved transversely across the machine-table at the proper time. This lever-arm is illustrated in full in Fig. 10. In Fig. 41 is illustrated the cutting mechanism, by means of which the string is automatically severed, and also certain fingers or nippers which automatically grasp the end of the string and draw it forward, as hereinafter explained.

The operation of making a bag by my improved machinery and method may be briefly described as follows: A suitably-cut blank is first stretched upon pins projecting upward from a frame that is mounted to slide on the machine-table. Said frame or carriage is then moved toward the center of the machine-table, carrying the blank under a paste-roll provided with circumferential projections that "spot" the blank with paste at proper points, the blank being finally deposited over a plunger of box form of the exact shape and size of the finished bag. Said plunger then moves upward, carrying the pasted blank with it until the latter comes into contact with certain plates which first double the blank downward on the plunger and then turn in the side flaps. As the blank is forced still farther upward the bottom flaps are folded downward by certain milled rolls that turn freely as the bag passes upward between them, but are prevented from revolving in the opposite direction by pawl-and-ratchet mechanism. The upward movement of the main plunger and bag is checked for an instant just as the bag enters between said rolls to permit a string to be carried around three sides of the bag near its lower or open end, and to allow the blank to be turned over said string. The plunger then resumes its upward movement and carries the bag up between the said rolls to the position shown in Fig. 35, when the plunger begins to move downward, but the bag is held by the milled rolls, which, as above stated, cannot revolve backward and consequently the bag is slowly stripped from the lower plunger on which it was formed. It should be explained here that the bag is formed with its inner side outward and must therefore be turned to bring it "right side outward." As the main plunger descends and seeks to leave the bag, an upper plunger follows downward and, engaging the bottom of the bag, forces it inward and telescopes the side walls until the bag is finally completely turned, when it is released from the grip of the milled rolls and drops upon a plate which has been moved into position under the throat of the folder mechanism. Said plate is then swung to one side, carrying with it the bag, which latter is thus removed from the path of the main plunger and the mechanism is ready to receive the next blank.

Having now briefly described the operation of forming a bag, I will proceed to specifically describe the mechanism by means of which the various necessary operations are performed.

In the annexed drawings the reference-figures 58 and 51 indicate the main supporting-frames of the machine, and 52 a table of plate form bolted to said main frames. Mounted in journal-bearings in said frames is a shaft 53, which bears a driving-pulley 54 and constitutes the main driver from which the various moving parts of the machine are timed. Driving-pulley 54 is shown as loosely mounted upon the shaft 53, and is locked thereto or released therefrom by means of an ordinary friction-clutch 54' mounted upon the said shaft 53 and controlled by an operating-lever 54$^a$. Shaft 53 bears a small gear 55 that meshes with and drives a larger gear 56 on a shaft 57, and also a gear 58 on a shaft 59. Shafts 57 and 59 are journaled in the main frames and bear cams that control the movements of certain of the machine elements.

60 and 61 denote rods that connect the main frames 50 and 51 and serve to stiffen the complete machine.

On shaft 57 are two cams 62 63, arranged side by side, upon which ride rollers 62$^a$ 63$^a$, secured to the sides of lever-arms 62$^b$ 63$^b$. One end of each of said lever-arms is hinged to the rod 61. The free end of lever 63$^b$ is connected by a link 63$^c$ with a vertical rod 64 arranged to slide in a tubular shaft 65, which in turn slides in a bearing 66 located in a cross-frame supported between the frames 50 and 51.

The lower end of the tubular shaft is connected with the free end of lever 62$^b$, already described, and it will now be understood that each revolution of the cam-shaft 57 will result in forcing the levers 62$^b$ 63$^b$ and the rods 64 and 65 upward and finally returning the same to their normal (lowest) positions. The upper end of rod 64 has secured thereto a block 67 of the size and shape of the inside of the bag to be made, and this block, which I term the "lower" or "main" plunger, is adapted to pass upward through a rectangular opening in the table 52. The upper end of the tubular shaft or rod 65 has secured thereto a rectangular plate with upwardly-extending flanges 67ª, adapted to slip over the lower end of the plunger 67 when the tubular shaft is slid lengthwise on the rod 64, the flanges 67ª being thus brought into service, when it becomes necessary to fold the edges of the bag over the puckering-string, as hereinafter described.

It will be seen by reference to Figs. 5, 7, and 9 that the cams 62 and 63 are alike in outline excepting only at one point. When in service they cause the levers 62ᵇ and 63ᵇ to move the rods 64 and 65 upward, in unison, until the point of difference is reached, when the lever 62ᵇ is, for an instant, forced in advance of the companion-lever 63ᵇ, (see Fig. 9,) thus causing the flanges 67ª to slip over the lower end of plunger 67. As the cams continue to revolve and their circumferential faces become again parallel, the lever 62ᵇ drops back to its normal position, opposite the lever 63ᵇ, and during the remainder of the revolution of said cams the levers and their rods 64 and 65 preserve the same relative positions. Secured to the table 52 at the rear side of the machine is a hollow standard 68, having secured to its upper end an arm 69 whose free end overhangs the main plunger 67. Arranged to slide in the standard 68 is a rod 70 to whose upper end is secured an arm 71, located over the arm 69 and bearing a rod 72 that is fitted to slide freely in said arm 69, as best seen in Fig. 1 of the drawings. The lower end of rod 72 bears a block 73 which I term the "upper" plunger or follower. Said block is located immediately in vertical alignment with the main plunger 67 and is substantially of the same shape but somewhat smaller. The chief office of this upper plunger is to follow the main plunger downward after a bag has been made and turn the bag inside outward. The lower end of rod 70 is connected with the free end of a lever 74 whose other end is hinged on the tie-rod 61. Upon the side of lever 74 is a roll 75 that rides upon the face of a cam 76, mounted on shaft 57 in such manner that at each revolution of said cam the rod 70 and its connected parts are caused to rise and fall. Extending downward from the rear end of bar 71 is a rod 77, which is formed with rack-teeth throughout a considerable part of its length, and said rack engages a pinion-gear 78 on a short stud 79 that is supported in a stand 80, secured to the table 52. Secured to the pinion-gear 78 is a bevel-gear 78ª that meshes with a larger bevel-gear 81 on the standard 68. Gear 81 is attached to an arm 82 of plate form, of such length that it may be swung underneath the upper plunger 73 to receive the finished bag, and then swung to one side to remove said bag from the path of the lower plunger. When the rod 70 moves downward during the operation of turning a finished bag inside out, as already described, the rack-rod 77 imparts motion to the described train of gearing 78, 78ª, and 81, to slowly swing the plate 82 around. At the exact instant when the lower plunger passes downward through the table 52 to its lowest position and the turned bag is about to drop from the upper plunger said plate 82 passes beneath the folder-throat and receives said bag. As the arm 71 passes upward to lift the upper plunger 73, the rack 77 and the described train of gearing swing said plate around to its normal position, at the rear of the machine, thus removing the bag, which, if the plate is moved quickly and stopped suddenly, is thrown off said plate into a suitable receptacle, or, if preferred, it may be removed by the attendant of the machine.

Previous to a blank being deposited over the lower plunger to be formed into a bag the same is first "spotted" with paste at certain predetermined points, which paste, adhering, serves to retain the blank in bag-shape after the removal therefrom of the forming-plunger, and this pasting mechanism I will now proceed to describe:

Adjacent to the opening in the table 52, through which the main plunger passes, is a plate 83 that is supported on pillars 84, secured to said table, thus elevating the plate 83, so that a carriage 85 may pass under said plate. (See Fig. 11.) Mounted upon plate 83 is a paste-pan 86, in which are journaled distributing-rollers 87 88, the latter of which engages certain ribs and blocks 89ª, projecting radially from the circumference of roll 89. Any suitable adhesive mixture may be deposited in pan 86 and distributed by the described rollers, but I prefer to use a hot waterproof cement that will dry quickly and withstand changes of temperature and moisture. The paste-roll 89 is journaled at each end in stands 90, secured to table 52 and bears near each end small pinion-gears 91, which are engaged by vertical racks 92 that slide in bearings 93, secured to the main supporting-frames of the machine. The lower end of each rack 92 is connected with the free end of a lever-arm 94, whose other end is hinged on the tie-rod 60, and said lever-arm has secured to one side a roll 95 that rides on the circumferential face of a cam 96 on shaft 59 in such manner that each revolution of said cam serves to force the lever 94 and rack 92 upward (see Fig. 5) and thus revolve the paste-roll forward and backward. Secured to the ends of the paste-roll shaft are also pinion gears 97 (somewhat larger than the gears 91) that mesh with rack-teeth 85ª, cut on the sides of the carriage 85 already referred to. This carriage is arranged to slide in suitable ways on the machine-table 52 and serves to carry the cloth blank under the paste-roll to receive proper spots of paste, and then deposit said blank immediately over the opening in the table 52, through which the main plunger passes upward.

The cloth blanks are stretched one at a time upon pins $85^b$, projecting upward from carriage 85, or rather from plates $85^c$, hinged in said carriage, as best seen in Figs. 11, 14, and 15. Said hinged plates are also indicated by dotted lines in Fig. 12. When the racks 92 travel upward, the carriage 85 will, through the gears 91 and 97 and the rack-teeth $85^a$ cut therein, be caused to pass forward under the paste-roll, and said blank is then properly spotted with paste, such spottings being determined by the blocks or ribs formed upon the circumferential surface of said paste-roll, and as readily understood by reference to Figs. 18, 19, 20, and 21. As the carriage 85 passes forward under the paste-roll, the plates $85^c$ slide upon the bed 52 and are thus held up in such position that the pins may support the bag-blank stretched thereon; but so soon as the carriage has reached its extreme forward position (where it is desired to drop the blank) certain openings $52^a$ in table 52 are reached, into which openings the hinged plates $85^c$ drop, as seen in Figs. 11 and 14, thus withdrawing the pins from the blank and leaving the latter in position to be forced upward by the plunger 67 into the folding-throat. The carriage 85 rests in its extreme forward position until said plunger begins to raise the blank and then is returned to its normal position or starting point to have another blank stretched upon its pins. Two of the racks 92, levers 94, and cams 96 may be employed, operating at opposite ends of the paste-roll, as illustrated, or one only, but I prefer the duplex form, as it insures an even and steady movement of the blank-carriage 85.

Bolted near the end of the overhanging arm 71 are two vertically-depending plates 98 and 99. Plates 98 and 99 are provided with vertically-extending ways, on which are arranged to slide auxiliary plates 98'. When the pasted blank is raised from the carriage 85 it is forced between the two plates 98', supported on plates 98 99, and said blank is thus folded down by the plates 98' on opposite sides of the plunger 67, as indicated by dotted lines in Fig. 27. As the plunger moves upward between plates 98' certain angular lips $98^a$ projecting from one of these plates 98' engage and turn inward the flaps marked $e$ of the cloth blank, Figs. 21, 28, and 29, and an instant later similar lips projecting from the opposite plate 98' engage the flaps marked $f$ and fold them over the flaps $e$, as seen in dotted lines in Fig. 30. The operation, as thus far described, of folding the blank is clearly seen in Figs. 27 to 30.

The fact that the plates 98' are capable of traveling vertically on ways has already been referred to. In addition to this attention is called to the fact that the lips $98^a$ are so supported in the plates 98' as to be capable of horizontal adjustment therein, or the lips of each plate may be connected by spiral spring, as shown in Fig. 26.

After the flaps $e$ and $f$ have been folded, as already described, it will be seen that the flaps $g$ will be left projecting laterally. As the plunger continues to pass upward, flaps $g$ are engaged by two milled rolls $98^b$ between which the plunger passes, which rolls fold the flaps $g$ down over the flaps $e$ and $f$, (see Figs. 32 and 33,) and the flaps $e$, $f$, and $g$ will be retained in the positions folded by reason of the paste which has been previously properly deposited on said blank.

Projecting from the upper edge of each plate 98' is a rib or flange $98^c$. As the former or plunger passes upward it engages these ribs just after the folding of the flaps $e$ and $f$ has been completed, and thus carries upward with it (between the milled rolls) the said plates 98', the milled rolls being grooved, as shown at $98^d$, to permit of the upward travel of the projecting lips $98^a$. This upward movement of plates 98' removes them from the path of the flanged plate $67^a$, which latter, traveling upward with plunger 67, would otherwise come in contact with said plates.

To prevent plates 98' from dropping from plates 98 99, and to hold them in proper position on the latter, I have provided each of the plates 98' on its rear side with a projecting pin or stud 99', adapted to travel in a slot $99^a$ provided for the reception of the same in the plates 98 and 99, this construction being readily understood by reference to Figs. 23 and 25.

When the plunger 67 is down the plates 98' are caused by gravity to rest in their lowest position, and will be at all times in said position unless forced upward by reason of the contact of the plunger 67 with the ribs $98^c$, the plates 98' being sufficiently heavy to resist the tendency of the plunger 67 to force the same upward while passing upward between them until the plunger comes in contact with the ribs, as above explained, after which time the plunger and plates move together.

With the folding mechanism described it will be seen that such mechanism can be readily varied to accommodate different sizes of plungers by simply providing plates 98' of a size corresponding to the plunger used and also by changing the size or distance apart of the milled rolls.

The milled rolls are journaled in the plates 98 99 and have upon their journal ends toothed disks $99^c$ that are engaged by pawls $99^d$ which allow the rolls to revolve freely as a bag is forced upward between them, but prevent the backward rotation of the rolls when the main plunger moves downward, thus serving to hold the bag in its elevation and strip it from said plunger as the latter descends. Just as the flaps $g$ pass between the milled rolls the plunger 67 stops for an instant to allow a puckering-string to be placed around three sides of the neck of the bag and to fold a narrow portion of the bag over said string. The stringing mechanism is best illustrated in Figs. 2, 38, 39 and 41.

The reference-figures 100 denote a frame that is mounted to slide in ways 101, secured to the table 52 at one side of the main plunger, and the lower portion of said frame is connected with the upper free end of an angle-lever 102 that is pivoted in a stand 103 secured to the machine-frame, as best seen in Fig. 10 of the drawings. The shorter arm of said lever 102 rides on the face of a cam 104 that is carried by shaft 59. At each revolution of said cam the lever-arm 102 is rocked on its fulcrum and the frame 100 is forced toward the plunger and back again. Said frame is formed at one side with an arm 105 whose end is perforated to receive and guide a string 106 which is drawn from a ball or spool hung on a stud 107 on frame 100. Secured to the inner side of arm 105, near the described perforation, is a knife arranged to operate with a shearing cut and formed of two sections, one of which 108 is an angle-plate whose knife edge is some distance away from the arm 105, the companion knife-section 109 being arranged to slide in a box bearing 110 secured to arm 105. A spring 111 serves to withdraw the knife-section 109 after a cut has been effected. In the described perforation through which the string passes are springs 112 whose free ends clasp the string at the delivery end of said perforation and allow the same to be drawn freely in one direction, but form a binding-lock to prevent the return of said string. When the string has been severed, a short section (about one-half an inch long in a full-size machine) is left projecting, and this is grasped and drawn forward by peculiarly-operating nippers or fingers that are carried by the free end of an arm 113 that is hinged to frame 100 and is held normally parallel with the arm 105, as in full lines in Figs. 38 and 39, by a spiral spring 114, one of whose ends is secured to the said arm 113 near its hinge-pivot, the other end being attached to the frame 100. Near the free end of arm 113 is a fixed jaw 115 and a pivoted jaw 116, the latter of which has a rearwardly-projecting arm $116^a$ and also a point $116^b$, that co-operates with the end of a spring 117 in such manner that the spring acts with considerable force to hold the jaw 116 in either an open or closed position. When frame 100 is drawn outward to its position of rest, the arm 113 engages a projection 118 on the ways 101 and its free end is swung laterally (see Fig. 39, dotted lines) toward the arm 105 until the open jaws pass between the two knife-sections and inclose the projecting end of the string. Just at that instant the movable jaw 116 engages a projection 110' on arm 105 and is closed, as at C in Fig. 41, the spring 117 then acting to hold said jaw closed. As the frame 100 is again moved forward toward the main plunger the arm 113 passes away from projection 118 and is immediately swung outward until parallel with arm 105, drawing with it the string, the several parts being in the positions illustrated in Fig. 38 as they approach the plunger 67 and the bag folded thereon. Continued movement of the frame 100 carries the string into contact with the bag, which is thus drawn into a groove $67^b$ in the main plunger on three sides of the bag, the string rendering freely from the ball meanwhile. When the string thus forces the cloth into the grooves $67^b$, the remaining narrow portion of the bag, between its mouth and the string, is naturally thrown outward, as seen in Fig. 32, and while in that position the described rectangular flanged plate $67^a$ is forced upward (see Fig. 33) and said narrow portion is turned over the string and stuck to the body of the bag. The flange $67^a$ is then withdrawn. Just at this instant the plate 100 will nearly have reached the limit of its forward movement, when the knife-section 109 engages a stop $52^b$ fixed in table 52 and the projection $116^a$ of the movable jaw 116 engages a similar stop $52^c$ fixed in said table. A slight further movement of plate 100 then results in severing the string and in opening the jaws to release its other end. Said plate 100 is then returned to the position shown in dotted lines in Fig. 39 and the nippers seize the cut end of the string, ready to draw it forward again.

In Fig. 41, A shows the string as it appears when ready to be cut. B shows the same during the act of cutting C. The arm 113 is shown as swung over to the arm 105, the nippers having just closed upon the projecting end of the string, and at D the said nippers are shown as if just opened by contact with the fixed stop $52^c$.

It will be remembered that during the described stringing operation the main plunger has been at rest, and the upper end or bottom of the bag is between the milled rolls $98^b$. As soon as the string is in place and the mouth of the bag turned back over it the plunger 67 continues its upward movement until the bag is forced nearly past the milled rolls, (see Fig. 34,) when the plunger 67 begins to descend, and the bag being held by said milled rolls (which it will be remembered can revolve only in one direction) is slowly stripped from said plunger. (See Fig. 35.) When the main plunger 67 begins to descend, the upper plunger follows it down, and as the main plunger slips out of the bag (which at this time is wrong side out) the upper plunger 73 follows down and forces the bottom of the bag through the body, the mouth of the bag being held by the milled rolls until the bag is completely turned. When the main plunger 67 leaves the bag its speed is at once increased by reason of the shape of its controlling-cam. Just as the turned bag is about to drop from the upper plunger and from between the milled rolls, the plate 82, which has been described, reaches its position over the main plunger, and the bag drops on it. The upper plunger then moves upward, and the rack 77 and gears 78, $78^a$, and 81 act to swing said plate 82 back to its position of rest. (Shown in Fig.

2.) The bag may then be removed by the attendant and the loose ends of the string tied together. One edge of the delivery-plate 82 is preferably upturned, as at 82$^a$, to prevent the bag from slipping off the plate if the latter should be started with its load suddenly.

I have illustrated and described mechanism for attaching but one string to the bag, but it will be obvious that said mechanism could be duplicated and located on the opposite side of plunger 67, the upper face of one system being as nearly as possible in the same plane as the lower face of the opposite system, so that the string could be laid in the groove 67$^b$ of the main plunger. This leaves the string ends projecting from opposite sides of the bag, as indicated in Figs. 36 and 37, and each pair of ends may be then tied by hand or otherwise. The several described operations are repeated in the production of each bag, beginning with the forward movement of the blank-carriage 85, which carries a new blank under the paste-roll, and then places it in position to be forced upward by plunger 67.

Excepting only the stretching of the cloth blanks on pins 85$^b$ and the tying of the strings, the machine performs its work automatically, and while embodying several movements each requiring accurately-timed mechanism, the machine as a whole is quite simple and durable, and not easily disarranged.

Having now described my invention, I claim—

1. In combination with a reciprocating plunger, a folder throat consisting of two pendent plates having angular side flap turners as set forth and having journaled therein, on opposite sides, rolls provided with pawl and ratchet devices that limit the rotary movement of said rolls to one direction only, substantially as and for the purpose specified.

2. In combination with a main plunger and an upper plunger, a folder throat between said plungers consisting of two pendent plates each having secured thereto angle-plates for folding the side flaps of a bag, said angle-plates being so relatively located on the two pendent plates that those of one plate engage and turn the flaps of one side of the bag in advance of those of the opposite side, and means for holding the open end of the bag during the operation of turning the same, all substantially as specified.

3. In combination with a reciprocating main plunger and a folder throat of the class referred to, an upper or follower plunger, mechanism for moving said upper plunger to cause it to follow the main plunger as the latter recedes after a bag has been formed thereon and means for holding the open end of the bag during the operation of turning the same.

4. In combination with a reciprocating main plunger, a folder throat of the class referred to, an upper plunger and mechanism for moving the latter to follow the main plunger as the latter recedes, and means for holding the open end of the bag during the operation of turning the same, a delivery plate and mechanism for moving said plate beneath said folder throat to receive the folded bag, all substantially as specified.

5. In combination with a reciprocating plunger and a folder throat of the class referred to, pasting mechanism adjacent to said plunger, consisting of an elevated paste-pan with distributing rolls journaled therein and a paste roll with circumferential projections as set forth, a blank carrier mounted to travel beneath said paste-roll and to deliver a blank between the plunger and throat and means consisting of racks and pinions, for connecting said carrier and paste-roll, all substantially as specified.

6. In combination with a main plunger, mounted upon a reciprocating rod, a tube mounted to slide on said rod and bearing a flange adapted to slip over the end of the plunger, and mechanism substantially as described for sliding the said flange over the plunger end, for the purpose specified.

7. In combination with a reciprocating main plunger, having a groove 67$^b$ near one end, and mechanism for folding a bag blank upon said plunger, mechanism as set forth for placing a string around said bag, and means, consisting of a flange adapted to slide over the plunger end, for turning the bag over said string.

8. In combination with a reciprocating main plunger and mechanism for folding a bag-blank thereon, mechanism for placing a string around said plunger consisting of a plate movable transversely to the movement of the plunger, said plate having arms that may straddle the plunger one of which bears at its free end, string cutting devices as set forth, the other arm having at its free end fingers for grasping the string end, and mechanism both for swinging said last named arm into engagement with the first named and for opening and closing said fingers, all substantially as specified.

ELISHA S. STAPLES.

Witnesses:
FRANK H. ALLEN,
ALONZO M. LUTHER.